(12) United States Patent
Lin

(10) Patent No.: US 12,296,906 B2
(45) Date of Patent: May 13, 2025

(54) SEAT ANGLE ADJUSTMENT DEVICE FOR LIFTABLE SEATPOST

(71) Applicant: J.D COMPONENTS CO., LTD., Chang Hua Hsien (TW)

(72) Inventor: Yu-An Lin, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 128 days.

(21) Appl. No.: 18/152,488

(22) Filed: Jan. 10, 2023

(65) Prior Publication Data
US 2023/0219645 A1 Jul. 13, 2023

(30) Foreign Application Priority Data
Jan. 10, 2022 (TW) .................................. 111200313

(51) Int. Cl.
*B62J 1/04* (2006.01)
*B62J 1/08* (2006.01)

(52) U.S. Cl.
CPC .. *B62J 1/04* (2013.01); *B62J 1/08* (2013.01)

(58) Field of Classification Search
CPC ....................................................... B62J 1/04
See application file for complete search history.

(56) References Cited

U.S. PATENT DOCUMENTS

| 2015/0069734 | A1* | 3/2015 | Yu .............................. B62J 1/08 280/283 |
| 2019/0144061 | A1* | 5/2019 | Staples ...................... B62J 1/08 297/215.15 |
| 2019/0351966 | A1* | 11/2019 | Shirai ........................ B62J 1/08 |
| 2020/0023918 | A1* | 1/2020 | Shirai ........................ B62J 1/08 |

FOREIGN PATENT DOCUMENTS

| DE | 102015122778 A1 | * | 6/2017 | |
| EP | 4316957 A1 | * | 2/2024 | ............... B62J 1/04 |
| KR | 20200133470 A | * | 11/2020 | |

* cited by examiner

*Primary Examiner* — Timothy J Brindley
(74) *Attorney, Agent, or Firm* — MUNCY, GEISSLER, OLDS & LOWE, P.C.

(57) ABSTRACT

A seat angle adjustment device includes a seat tube, a lower clamp, an upper clamp, two nuts, and two bolts. The top end of the seat tube has two through holes and a convex curved surface. The lower clamp has two lower clamping grooves and a concave curved surface abutted against the convex curved surface of the seat tube. The upper clamp has two upper clamping grooves. Two saddle rail clamping grooves are formed between the upper and lower clamping grooves, and each have a position lower than the vertex of the convex curved surface of the seat tube. The nuts and the bolts are screwed to each other. One of them are disposed to the upper clamp and the other of them are disposed in the through holes. Thus, the present invention allows the lifting stroke of a seat to be increased when used with a liftable seatpost.

5 Claims, 3 Drawing Sheets

SEAT ANGLE ADJUSTMENT DEVICE FOR LIFTABLE SEATPOST

BACKGROUND OF THE INVENTION

1. Field of the Invention

The present invention relates to seat angle adjustment devices and more particularly, to a seat angle adjustment device for a liftable seatpost.

2. Description of the Related Art

The assembly of a bicycle seat is completed by using an upper clamp and a lower clamp to clamp a saddle rail therebetween and simultaneously using bolts and nuts to be locked and positioned with a seat tube. As such, the pitch angle of the bicycle seat can be adjusted according to the rider's preference for increasing the riding comfort. However, the clamping position of the saddle rail is relatively high, so the lifting stroke of the bicycle seat is limited to a certain extent when the bicycle seat is used with a liftable seatpost.

SUMMARY OF THE INVENTION

It is a primary objective of the present invention to provide a seat angle adjustment device for a liftable seatpost, which can increase the lifting stroke of a bicycle seat.

To attain the above objective, the seat angle adjustment device of the present invention comprises a seat tube, a clamping component, and a fixing component. The top end of the seat tube is provided with two through holes and a convex curved surface located between the through holes. The clamping component includes a lower clamp and an upper clamp. The lower clamp has two lower clamping grooves and a concave curved surface located between the lower clamping grooves and abutted against the convex curved surface of the seat tube. The upper clamp has two upper clamping grooves corresponding to the lower clamping grooves of the lower clamp, so that two saddle rail clamping grooves are formed between the upper and lower clamping grooves. The saddle rail clamping grooves each have a position lower than a vertex of the convex curved surface of the seat tube. The fixing component has two nuts and two bolts screwed to the nuts. One of the nuts and the bolts are disposed to the upper clamp, and the other of the nuts and the bolts are disposed to the through holes of the seat tube.

It can be seen from the above that the seat angle adjustment device of the present invention allows the position of the saddle rail clamping grooves to be lowered below the vertex of the convex curved surface of the seat tube, such that the lifting stroke of the bicycle seat can be increased when the seat angle adjustment device of the present invention is used with a liftable seatpost.

Preferably, a collar is sleeved on the top end of the seat tube and provided with the through holes.

Preferably, an end block is inserted into the top end of the seat tube and provided with the convex curved surface.

Preferably, the seat tube has a shaft hole passing through the top and bottom ends thereof. The end block has a shaft portion detachably and rotatably inserted into the shaft hole of the seat tube. In this way, a pneumatic cylinder disposed in the seat tube can be inflated through the shaft hole.

Preferably, a first teeth portion protrudes radially from the peripheral wall of the shaft hole. A second teeth portion is provided at the bottom end of the shaft portion of the end block and detachably engaged with the first teeth portion of the seat tube. In this way, the installation error of the seat can be eliminated by rotating the end block.

Other advantages and features of the present invention will be fully understood by reference to the following specification in conjunction with the accompanying drawings, in which like reference signs denote like components of structure.

DETAILED DESCRIPTION OF THE INVENTION

Figure 1:
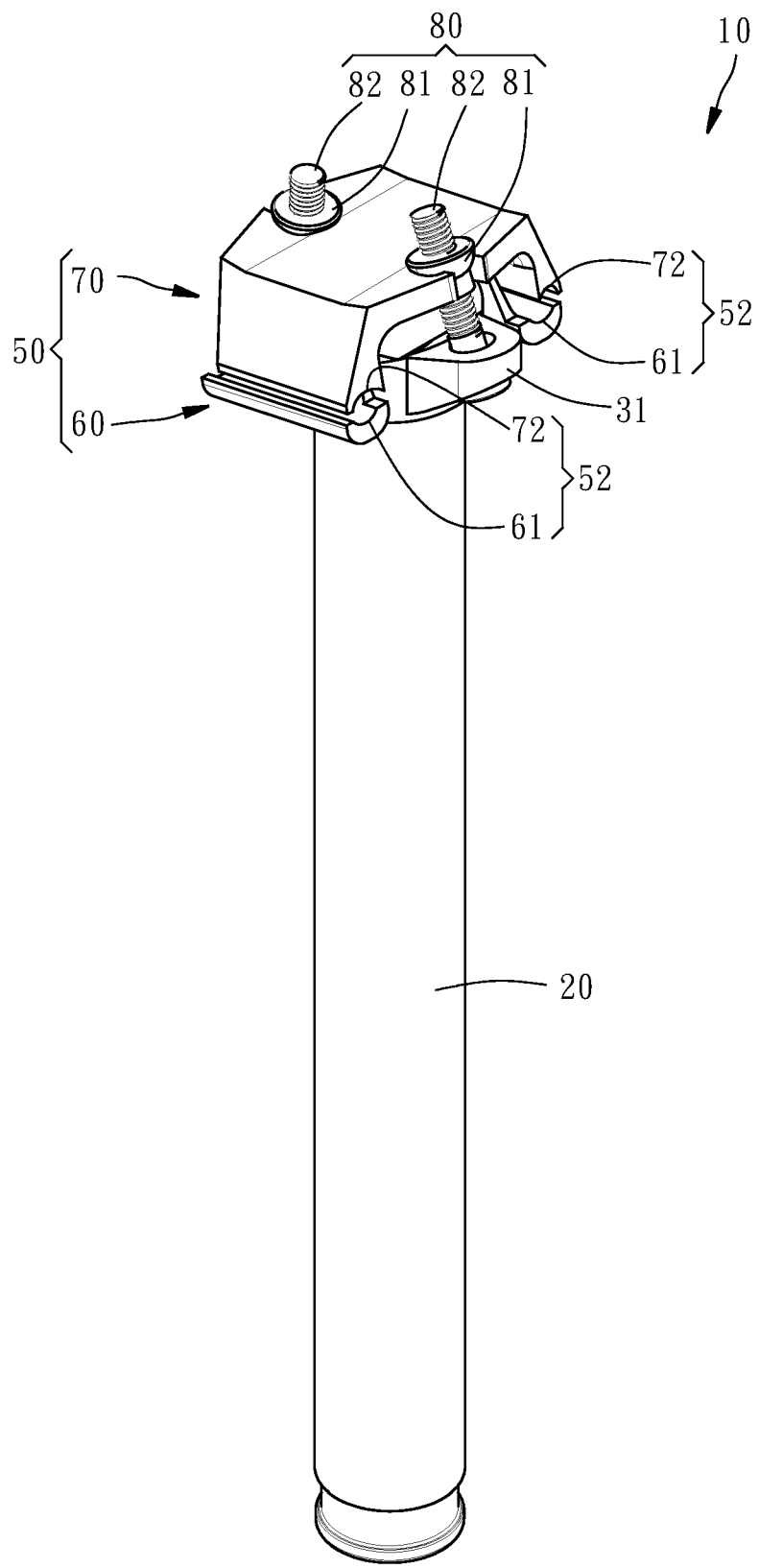
FIG. 1 is a perspective view of a seat angle adjustment device of the present invention.
Figure 2:
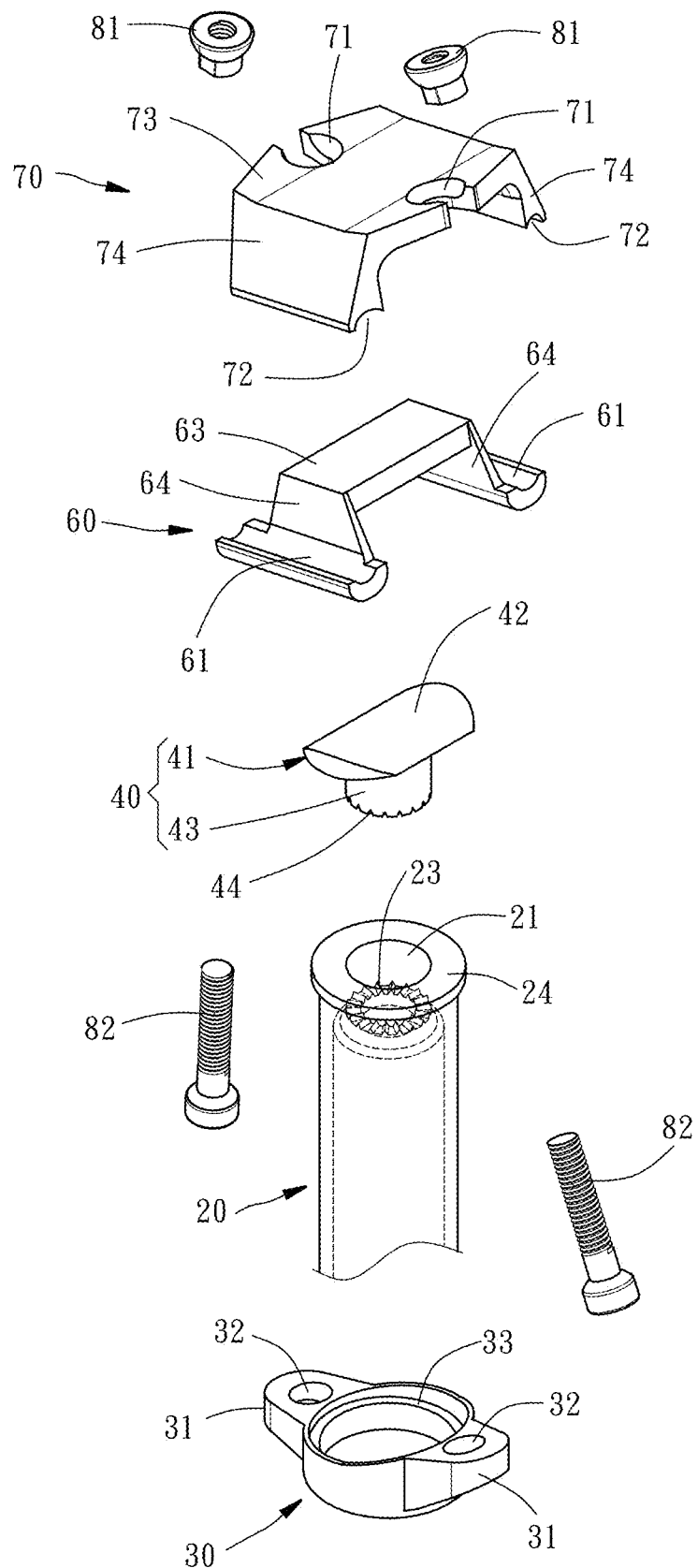
FIG. 2 is an explode view of the seat angle adjustment device of the present invention.

Referring to FIGS. 1 and 2, a seat angle adjustment device 10 of the present invention comprises a seat tube 20, a collar 30, an end block 40, a clamping component 50, and a fixing component 80.

The seat tube 20 has a shaft hole 21 passing through the top and bottom ends thereof. The top end of the seat tube 20 has a first teeth portion 23 protruding radially from the peripheral wall of the shaft hole 21, and a first baffle edge 24 at the outer surface thereof.

The collar 30 is sleeved on the seat tube 20 from the bottom end of the seat tube 20. The outer surface of the collar 30 has two opposite lug portions 31 each provided with a through hole 32, and the inner surface of the collar 30 has a second baffle edge 33 abutted against the first baffle edge 24 of the seat tube 20.

The end block 40 has an end portion 41 and a shaft portion 43. A convex curved surface 42 is formed on the top surface of the end portion 41. The shaft portion 43 extends downwards from the bottom surface of the shaft portion 41, and the bottom end of the shaft portion 43 has a second teeth portion 44. The shaft portion 43 of the end block 40 is detachably and rotatably inserted into the shaft hole 21 of the seat tube 20 in a way that the end portion 41 of the end block 40 protrudes out of the top end of the seat tube 20, and the second teeth portion 41 of the end block 40 is engaged with the first teeth portion 23 of the seat tube 20.

Figure 4:
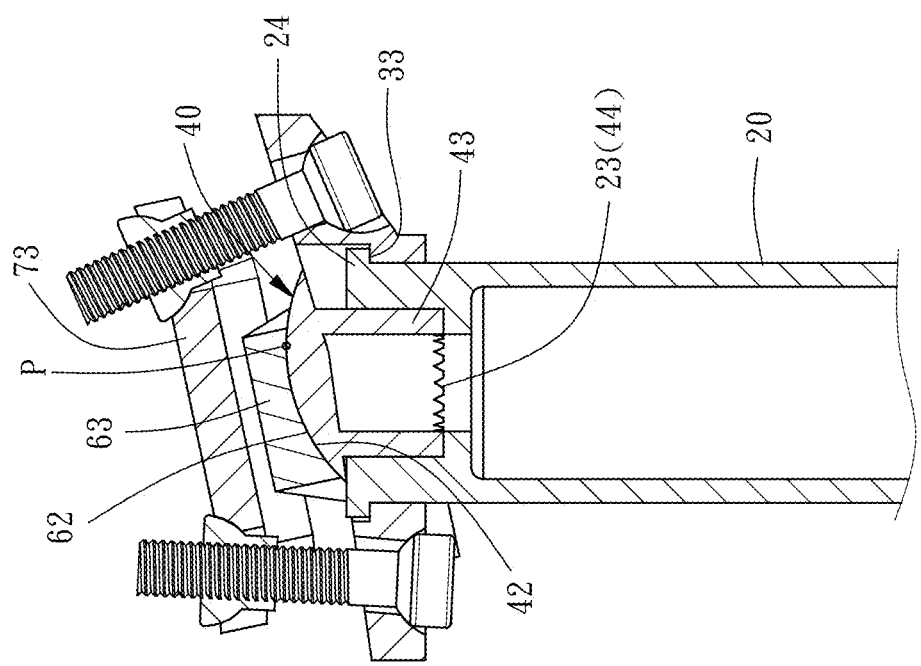
FIG. 4 is a sectional view of the seat angle adjustment device of the present invention.
Figure 3:
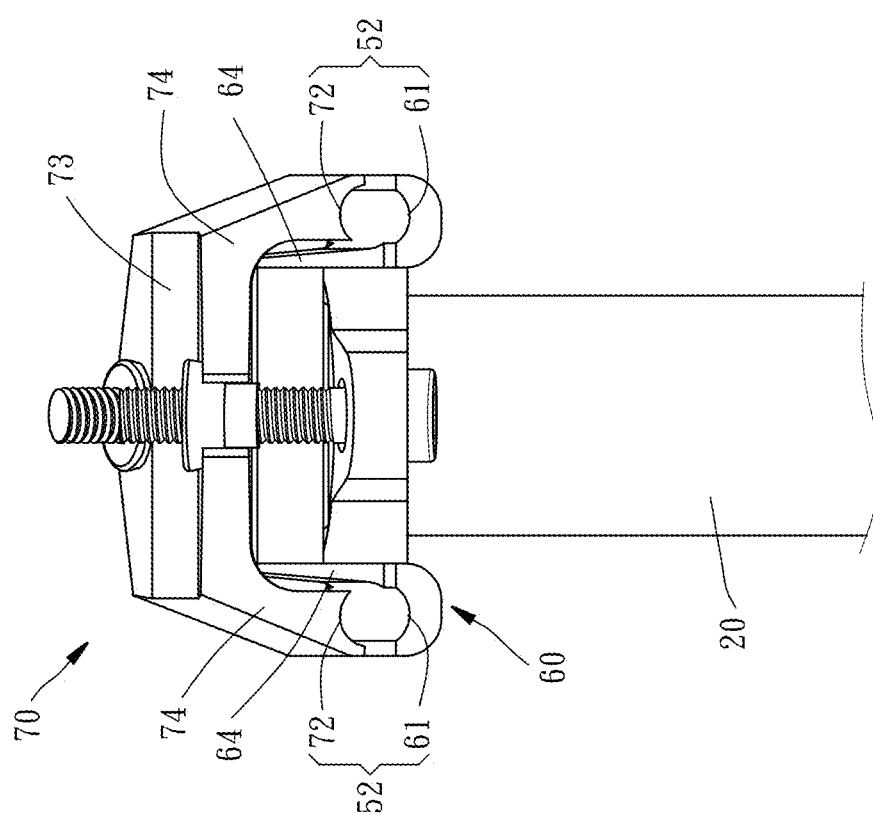
FIG. 3 is a left lateral view of the seat angle adjustment device of the present invention.

The clamping component 50 includes a lower clamp 60 and an upper clamp 70. The lower clamp 60 has two lower clamping grooves 61 and a concave curved surface 62 located between the lower clamping grooves 61 and abutted against the convex curved surface 42 of the end block 40. The upper clamp 70 has two countersinks 71 and two upper clamping grooves 72. The upper clamping grooves 72 of the upper clamp 70 correspond to the lower clamping grooves 61 of the lower clamp 60, so that two saddle rail clamping grooves 52 are formed therebetween. The position of each of the saddle rail clamping grooves 52 is lower than the vertex P of the convex curved surface 42 (as shown in FIGS. 3 and 4). As shown in FIG. 2, the lower clamp 60 has a first top wall 63 provided with the concave curved surface 62, and two opposite first lateral walls 64 extending downwards from the first top wall 63 to cover the convex curved surface 42 of the seat tube 20 and provided with the lower clamping grooves 61. Further, the upper clamp 70 has a second top wall 73 located above the first top wall 63 of the lower clamp 60 and provided with the countersinks 71, and two opposite second lateral walls 74 extending downwards from the second top wall 73 to cover the first lateral walls 64 and provided with the upper clamping grooves 72. As such, the convex curved surface 42 and the concave curved surface 62 can be covered and protected by the first lateral walls 64 and the second lateral walls 74.

The fixing component 80 includes two nuts 81 and two bolts 82. In this embodiment, the nuts 81 are disposed in the countersinks 71 of the upper clamp 70. The bolts 82 are penetrated through the through holes 32 of the seat tube 20 from up to bottom and screwed to the nuts 81 for securing the upper clamp 70, the lower clamp 60, the collar 30, and the seat tube 20 together, and clamping a saddle rail (not shown) in the saddle rail clamping grooves 52. What needs to be added here is that the nuts 81 and the bolts 82 can be interchangeable to also achieve a locking effect.

As indicated above, the seat angle adjustment device 10 of the present invention uses the cooperation of the concave and convex curved surfaces 62, 42 to adjust pitch angle of the seat for increasing the riding comfort. Further, the position of the saddle rail clamping grooves 52 is lowered below the vertex P of the convex curved surface 42, such that the lifting stroke of the seat can be increased when the seat angle adjustment device 10 of the present invention is used with the liftable seatpost. In addition, when the seat angle adjustment device 10 of the present invention is applied to the liftable seatpost, the seat may not face forwards due to installation errors. At this time, the end block 40 is pulled upwards to separate the second teeth portion 44 of the end block 40 from the first teeth portion 23 of the seat tube 20, and then the end block 40 is rotated to a position where the seat faces forwards and pressed downwards to enable the second teeth portion 44 of the end block 40 to engage with the first teeth portion 23 of the seat tube 20, thereby achieving an effect of eliminating the installation error of the seat. In addition, when the entire end block 40 is removed, a pneumatic cylinder (not shown) disposed in the seat tube 20 can be inflated through the shaft hole 21.

What is claimed is:

1. A seat angle adjustment device for a liftable seatpost, comprising:
   a seat tube including a top end provided with two through holes and a convex curved surface located between the through holes;
   a clamping component including a lower clamp and an upper clamp, the lower clamp having two lower clamping grooves and a concave curved surface located between the lower clamping grooves and abutted against the convex curved surface of the seat tube, the upper clamp having two upper clamping grooves corresponding to the lower clamping grooves of the lower clamp, so that two saddle rail clamping grooves are formed between the upper clamping grooves of the upper clamp and the lower clamping grooves of the lower clamp, the saddle rail clamping grooves each having a position lower than a vertex of the convex curved surface of the seat tube; and
   a fixing component having two nuts and two bolts screwed to the nuts, one of the nuts and the bolts being disposed to the upper clamp, and the other of the nuts and the bolts being disposed to the through holes of the seat tube;
   wherein the lower clamp has a first top wall provided with the concave curved surface, and two opposite first lateral walls extending downwards from the first top wall to cover the convex curved surface of the seat tube and provided with the lower clamping grooves;
   wherein the upper clamp has a second top wall located above the first top wall, and two opposite second lateral walls extending downwards from the second top wall to cover the first lateral walls and provided with the upper clamping grooves.

2. The seat angle adjustment device as claimed in claim 1, wherein a collar is sleeved on the top end of the seat tube and provided with the through holes.

3. The seat angle adjustment device as claimed in claim 1, wherein an end block is inserted into the top end of the seat tube and provided with the convex curved surface.

4. The seat angle adjustment device as claimed in claim 3, wherein the seat tube has a shaft hole passing through the top end and a bottom end thereof, the end block has a shaft portion detachably and rotatably inserted into a top end of the shaft hole.

5. The seat angle adjustment device as claimed in claim 4, wherein a first teeth portion protrudes radially from a peripheral wall of the shaft hole; a second teeth portion is provided at a bottom end of the shaft portion of the end block and detachably engaged with the first teeth portion of the seat tube.

* * * * *